Patented June 11, 1946

2,401,813

UNITED STATES PATENT OFFICE 2,401,813

STERILIZATION OF STARCH

August J. Bulfer, Berwyn, Ill., assignor to Corn Products Refining Company, New York, N. Y., a corporation of New Jersey No Drawing. Application December 13, 1943, Serial No. 514,171

5 Claims. (Cl. 127—71)

This invention relates to the treatment of starch, more particularly corn (maize) starch, in such manner as to render it free of thermophylic bacteria. As used herein, the term "thermophylic bacteria" refers to organisms of the aerobic and anerobic types which resist, and propagate at, high temperatures.

An object of the invention is to produce a starch which is substantially free of thermophylic bacteria, has good color and is free of foreign or unpleasant taste and odor. Another object is to provide a method of sterilizing starch to render it free of thermophylic bacteria without appreciably altering the viscosity characteristics of the starch subjected to sterilization. A further object is to produce a starch free of thermophylic bacteria which gives a paste of good body, i. e., one which retains its viscosity over a wide range of cooking conditions.

The invention will be found of particular advantage in the preparation of starch which is especially suitable for use by the canning trade. In the canning field, the starch used must fulfill certain requirements. Thus, it must have an extremely low content of thermophylic bacteria, should have good color, should not have any foreign or unpleasant odor and finally, when cooked should have a satisfactory body. The National Canners' Association has established certain minimum standards concerning the content of thermophylic bacteria of both the aerobic and anerobic types permissible in materials used in canning foods. Starch treated according to the present invention not only meets these standards but also contains so far less than this permissible number of thermophylic bacteria that it may be described as free of thermophylic bacteria and will be referred to hereinafter as "thermophylic free starch." In addition, it possesses the other properties above mentioned as desirable in a canning starch.

Various processes have heretofore been proposed to produce starch suitable for use by the canning trade but none of these processes has proven wholly satisfactory. One of these methods, which is described in Kerr U. S. Patent 2,332,320, involves treating the starch with chlorine. While this process produces a satisfactory product as concerns the provision of a low bacterial content, it is not without some objectionable features. It is necessary to remove the chlorine after the sterilizing action thereof and this is accomplished through the use of a chemical agent which, after it has served its purpose, must also be removed from the starch. This latter step is effected by washing the starch. Thereafter the starch is dried. Since the sterilization is carried out in the wet state prior to drying there is danger of recontamination of the starch during the drying step, as drying air very often contains bacteria spores. Moreover, some of the chlorine apparently becomes chemically attached to the starch molecule so that not all of the chlorine is removed by the chemical agent. This residual chlorine is released from the starch under pressure cooking conditions as the starch is used in the canning industry and produces an undesirable thinning effect on the starch. To inhibit this thinning action of the chlorine upon the starch it is necessary to add to the starch a certain amount of a neutralizing or buffering agent, e. g., di-sodium phosphate. The process is, therefore, somewhat involved and expensive.

I have now found that I can produce a starch which is free of thermophylic bacteria, which retains its thick boiling character and which is in all other respects well adapted for use by the canning trade, by a process which is simple and inexpensive and which obviates various shortcomings and disadvantages of processes heretofore known for the production of canning starch. In general, my invention embraces roasting, i. e., dry heating, starch which is substantially free of moisture, at a temperature of about 240° to 260° F. for a period of about 1 to about 3 hours.

In carrying out the process of the invention starch e. g., raw, unmodified corn starch, containing 12% to 15% moisture, preferably in powdered form, is rapidly dried as in a Huhn drier or the like, to a relatively low moisture content of the order of about 1% to 2% and preferably not exceeding about 3%. In practising a preferred form of the invention, the dried starch is thereafter promptly transferred to a roasting device, such as a dextrine cooker or the like. This may advantageously be heated prior to the introduction of the starch, as to a temperature approximating that at which the starch is to be sterilized therein. The dried starch is then roasted at a temperature of about 240° to 260° F. for a period of about 1 to 3 hours to effect the desired sterilization. The starch is then cooled, reeled and packed in conventional manner.

In practising my invention one may use for example, ordinary corn starch produced by any of the usual methods. Preferably starch to be treated is in powdered form. In the conventional manufacture of corn starch the starch, after being separated from the germ, fibre and gluten of the corn kernel, is washed and subjected to two or more filtering steps, as in an American filter, and then dried to a moisture content of about 12% to 15% either in kilns or by flash drying. The resulting starch is known as pearl starch and in general the invention contemplates the use of such starch, although other starches, and corn starch produced by other methods of manufacture or removed at different stages of the conventional process above described may be used.

The removal of moisture from the starch before it is subjected to the sterilizing treatment may be effected in any type of drier which is adapted to rapidly drive off the moisture from the starch and at the same time effect removal of the released moisture vapor so as to minimize any opportunity for the starch to be modified to any appreciable degree. A commercial type of drier known as the Huhn drier is particularly suitable for reducing the moisture content of pearl starch or the like containing about 12% to 15% moisture, for purposes of the present invention. Such a drier may be used to effect desired drying, to a moisture content of 3% or less, of starch containing up to 20% moisture, without modifying the starch appreciably. However, the moisture content of the starch entering such drier should not exceed 20%, in order to prevent any possible gelatinization of the starch in the drier. The drying of the starch by means of a drier of the Huhn type may be carried out in a single pass or in several passes in one or in a series of such driers.

Spray drying processes or the like may also be used to remove moisture from the starch to be sterilized according to this invention. In the event a spray drying process is used, second American filter cake or the like may be suspended in water to a gravity of about 24° Baumé and then this liquor spray dried to a moisture content of about 3% or less. Alternatively, the spray drying of the liquor may also be carried out so that the moisture content of the starch is reduced to about 5% to 6% and then the starch may be passed through a drier of the Huhn type or the like to further reduce the moisture content to about 3% or less.

The operation of the drying equipment should be so controlled that the temperature of the starch particles does not exceed about 130° to 140° F. at any time until after the moisture content of the starch has been reduced to about 3% or less, in order to prevent modification of the starch; although after the moisture content of the starch has been reduced to the desired level the temperature of the starch particles may be raised to a temperature as high as about 240° F. but not exceeding 260° F. In fact, it is convenient and advantageous to discharge the dried starch at a temperature of about 240° F. and to promptly transfer it to the roasting device so that the temperature at which it is delivered to the latter does not fall below about 230° F. Thus the sterilization of the dried starch may be commenced almost immediately upon introduction of the starch into the roasting device, whereas otherwise it would be necessary to raise the temperature of the starch in the roasting device to the sterilizing range hereinabove specified.

The temperature of the starch particles in the roasting device during sterilization should not exceed about 260° F., or be lower than about 240° F.; 250° F. is the preferred sterilizing temperature.

The starch to be sterilized should not contain more than about 3% moisture, as hereinabove indicated. Starch with a higher moisture content will suffer a substantial loss of hot paste viscosity under conditions herein specified for sterilization; this is to be avoided if the thick boiling characteristics of sterilized canner's starch, for example, are not to be impaired. The lower the moisture content, the quicker and more efficient is the destruction of the bacteria and the less is the modification of the starch. The aim in preparing the starch by drying for the sterilizing treatment should be to reduce the moisture content as low as may be feasible and expedient, and in any event below 3%. Under practical operating conditions, as when a drier of the Huhn type or the like is used to prepare starch for sterilization in accordance with the invention, the moisture content of the starch leaving the drier and entering the dextrine cooker or the like will vary between 1% and 2%.

Any type of rotating vessel having suitable provision for indirect heating of the material charged thereto and equipped with agitating means sufficient to insure uniformity of heating, may be used to sterilize the starch. The conventional type of dextrine cooker or the like may be used satisfactorily.

Time is an important factor in the sterilizing treatment and the starch should not be heated longer than necessary to effect the desired sterilization. In general, the period of time necessary for the sterilization of the starch will be from about 1 to about 3 hours, depending upon the moisture content and temperature at which the starch enters the roasting device, upon the temperature at which the starch is maintained during the sterilizing treatment and upon the uniformity with which the starch is heated.

Raw corn starch, e. g., second American filter starch, treated according to the above described process will have a Scott viscosity index of about 55 to 60, while the initial Scott index of the same starch, will be about 80 to 90, depending upon manufacturing conditions and the character of the corn from which the starch is derived. The Scott index which is referred to herein as a measure of the hot paste viscosity of starch is determined as follows:

*Scott test.*—15 grams of commercial basis (i. e., including water) of 12% moisture starch is mixed with 280 cc. of distilled water at room temperature. The beaker containing the mixture is put into a boiling water bath and stirred constantly for five minutes by means of a mechanical agitator rotating at 200 revolutions per minute. At the end of five minutes the beaker is covered with a watch glass and the contents heated for another period of five minutes. At the end of ten minutes the watch glass is removed, the condensate is drained back and the material stirred at the above rate, the draining and stirring taking ten seconds. The watch glass is put back on the beaker and the mixture heated for one minute and fifty seconds or until twelve minutes time has elapsed. The watch glass is removed, the condensate is drained back into the beaker and contents stirred, these operations taking fifteen seconds. At the end of twelve minutes and fifteen seconds, elapsed time, the contents of the beaker is transferred to a Scott cup, described below, and at the end of fifteen minutes, total elapsed time, the plunger valve of the cup is withdrawn, allowing the paste to pass into a graduated cylinder arranged below the cup. The Scott index for any given paste is the number of seconds required for the delivery of 50 cc. of the starch paste from the cup. The Scott cup is a cup or funnel having a stainless steel cylindrical tube extending from the bottom. The internal diameter of the tube is 0.1168 inch and the length is 0.495 inch. This tube is screwed into the bottom of the Scott cup. A master cup is maintained for the purpose of standardizing other cups, using standard starch samples. These starch samples have their Scott determined in the master Scott cup as above described. Portions of these same samples are then tested for Scott value with the Scott cup under test. The latter apparatus should check within 2 to 3 points of Scott against the Scott value of the sample determined by the master cup, and any necessary adjustments of the cup under test are made to this end.

My invention provides distinct advantages in several respects over processes heretofore known for the production of thermophylic free starch, notably canner's starch. The process is extremely simple and inexpensive, the time required for sterilization is short and no chemical agents are needed to destroy the bacteria. Since sterilization is effected after the starch is dried, there is no danger of contamination of the sterilized product by spores from the air as in prior processes involving sterilization of starch in the wet state and subsequent drying thereof. No color or odor is imparted to the starch during the sterilizing operation as may be the case when the heating is carried out in the presence of chemical reagents. Thick boiling starch treated according to the present invention does not lose its thick boiling character when, as in the case of use in the canning industry, it is cooked under pressures substantially above atmospheric.

The foregoing description has referred more particularly to the treatment of raw, unmodified corn starch but the invention is not limited thereto. The principles thereof are to be understood as applicable to the sterilization of cereal and root starches generally, whether unmodified or modified, e. g., as by acids, oxidizing agents etc. In all cases, sterilization may be effected without appreciable reduction in starch viscosity as measured by the Scott index.

Moreover, while the invention has been described above with particular reference to drying and sterilizing starch in separate devices it will be apparent to those skilled in the art that drying and sterilization of starch may, if desired, be effected in a single device, adapted to perform both of these functions. Thus, for example, the moisture content of the starch may be reduced to the desired degree, by means of a drier of the Huhn type or the like and thereafter sterilization may be effected in the same apparatus by in effect transforming the drier into a roasting device. This may be done by interrupting the normal flow of both air and starch through the apparatus and by appropriately controlling the supply of heating medium thereto so as to establish and maintain therein temperatures adapted to bring about desired sterilization of the starch.

I claim:

1. The process of treating starch to render it substantially free of thermophylic bacteria which comprises roasting starch having an initial moisture content not exceeding about 3%, at a temperature of about 240° to 260° F. for a period of about 1 to about 3 hours.

2. The process of producing thick-boiling thermophylic free starch which comprises drying raw, unmodified starch to a moisture content not substantially greater than 3% at a temperature to effect such drying without substantially modifying the character of the starch, and thereafter maintaining the starch at a temperature of about 240° to 260° F. for a period of about 1 to about 3 hours.

3. The process of producing thermophylic free corn starch having a 15 gram Scott viscosity index of about 55 to 60, which comprises reducing the moisture content of raw, unmodified corn starch to a maximum of about 3% by drying the same at a starch temperature not exceeding 130° to 140° F., and thereafter roasting the dried starch at a temperature of about 240° to about 260° F. for a period of about 1 to about 3 hours.

4. The process of producing thermophylic free corn starch having a 15 gram Scott viscosity index of about 55 to 60, which comprises reducing the moisture content of raw, unmodified corn starch by drying the same at a starch temperature not exceeding 130° to 140° F. until the moisture content of the starch has been reduced to a maximum of about 3%, continuing the drying of the starch at a starch temperature in excess of about 130° to 140° F., but not exceeding about 260° F., until the moisture content of the starch has been further reduced to a predetermined level, and thereafter promptly roasting the dried starch at a temperature of about 240° to about 260° F. for a period of about 1 to about 3 hours.

5. The process of producing thermophylic free starch which comprises drying starch to a moisture content not substantially greater than 3% at a temperature to effect such drying without substantially modifying the character of the starch, and thereafter maintaining the starch at a temperature of about 240° to 260° F. for a period of about 1 to about 3 hours.

AUGUST J. BULFER.